United States Patent
Mishra et al.

(10) Patent No.: US 7,273,581 B2
(45) Date of Patent: Sep. 25, 2007

(54) PROCESS FOR IN-SITU PREPARATION OF ALUMINIA—(TI,ZR) BORIDES COMPOSITE

(75) Inventors: Suman Kumari Mishra, Jharkhand (IN); Vladimir Andreevich Shcherbakov, Moscow (RU)

(73) Assignee: Council of Scientific and Industrial Research, New Delhi (IN)

( * ) Notice: Subject to any disclaimer, the term of this patent is extended or adjusted under 35 U.S.C. 154(b) by 623 days.

(21) Appl. No.: 10/934,781

(22) Filed: Sep. 7, 2004

(65) Prior Publication Data
US 2006/0049553 A1   Mar. 9, 2006

(51) Int. Cl.
*B28B 1/00*   (2006.01)
(52) U.S. Cl. .................. 264/649; 264/319; 264/332; 419/5; 419/10; 419/45
(58) Field of Classification Search .............. 264/319, 264/332, 649; 423/297; 419/5, 10, 45
See application file for complete search history.

(56) References Cited

U.S. PATENT DOCUMENTS

| | | | | |
|---|---|---|---|---|
| 4,592,882 | A | * | 6/1986 | Parrish ...................... 264/662 |
| 6,171,709 | B1 | * | 1/2001 | Koizumi et al. ............ 428/545 |
| 6,451,249 | B1 | * | 9/2002 | Koizumi et al. ............ 419/10 |
| 2004/0022712 | A1 | * | 2/2004 | Mishra et al. .............. 423/297 |

OTHER PUBLICATIONS

Sintering of ultrafine zirconium diboride powder prepared by modified SHS technique. By: Khanra, A. K.; Pathak, L. C.; Mishra, S.K.; Godkhindi, M. M.. Advances in Applied Ceramics: Structural, Functional & Bioceramics, 2005, vol. 104 Issue 6, p. 282-284, 3p.*
Preparation of Ultrafine Boron Nitride Powders by Self-propagating High-Temperature Synthesis. By: Borovinskaya, I. P.; Ignat'eva, T. I.; Vershinnikov, V. I.; Khurtina, G. G.; Sachkova, N. V.. Inorganic Materials, Jun. 2003, vol. 39 Issue 6, p. 588-593, 6p.*
Sintering behaviour of self-propagating high temperature synthesised $ZrB_2$-$Al_2O_3$ composite powder. By: Mishra, S.K.; Das, S.K.; Pathak, L.C.. Materials Science & Engineering: A, Jun. 2006, vol. 426 Issue 1/2, abstract only.*
Sintering behaviour of ultra-fine titanium diboride powder prepared by self-propagating high-temperature synthesis (SHS) technique. By: Khanra, A.K.; Godkhindi, M.M.; Pathak, L.C.. Materials Science & Engineering: A Apr. 2007, vol. 454-455, p. 281-287, abstract only.*

\* cited by examiner

*Primary Examiner*—Carlos Lopez
(74) *Attorney, Agent, or Firm*—Nixon & Vanderhye P.C.

(57) ABSTRACT

The present invention relates to an improved process for in-situ preparation of alumina-(Ti,Zr) borides composite. The present invention particularly relates to fast and in-situ process for synthesis and consolidation of $Al_2O_3$—$Zr/Ti\ B_2$ composites of approximate-95% density with controlled grain-growth in the range of less than or the order of 5 micrometer or less grain size using a dynamic Self propagating high temperature synthesis (SHS) process.

4 Claims, No Drawings

PROCESS FOR IN-SITU PREPARATION OF ALUMINIA—(TI,ZR) BORIDES COMPOSITE

FIELD OF THE INVENTION

The present invention relates to an improved process for in-situ preparation of alumina-(Ti,Zr) borides composite. The present invention particularly relates to fast and in-situ process for synthesis and consolidation of $Al_2O_3$—$Zr/Ti B_2$ composites of approximate-95% density with controlled grain-growth in the range of less than or the order of 5 micrometer or less grain size using a dynamic Self propagating high temperature synthesis (SHS) process.

The present invention is a low cost SHS synthesis of in-situ synthesis and consolidation of $Al_2O_3$—(Ti, Zr) borides composites of approximate-95% density with controlled grain-growth in the range of less than 5 micrometer grain size having wide range of applications. Such composites has applications in wear resistance, corrosion resistant, oxidation resistance, electrical, chemical, metallurgical, cutting tool applications, targets for composite coatings, etc. The produced composite in the present invention can be used either directly or after machining for the required applications. The coating by sputtering process requires a dense material. The present process provides the required density for the composites, which can be used for composite coatings for wear and corrosion resistance applications.

BACKGROUND OF THE INVENTION

Reference is made to U.S. Pat. No. 4,592,882 where alumina-zirconium/Titanium or both diborides are prepared from $Al_2O_3$ and Ti/Zr diboride particulate mixing. The mixture is pressed and sintered as pressure-less or hot pressing or hot isostat pressing (HIP) at around 2000° C. This process is conventionally followed but the grain-growth of borides as well as alumina hinders the densification and are undesired. The processing time is longer and requires costly high temperature furnaces. Similar processing are also reported by T. Watanbe and S. Kouno, Bull. Am. Ceram. Soc., 61, 970, 1982 and G. Suskin, G. Chepovetsky, J. Mater. Eng. Performance, 5, 396, 1996.

Reference is also made to patent GB 2285267 where composite of zirconium diboride with zirconium oxide and other oxides, AlN, ZrN and BN have been reported. The product has used low melting point borides such as Ni/Co boride. These will lead to larger grain-growth as well as reduce the high temperature uses of such composite. The composite powder is prepared by Self-Propagating high temperature synthesis (SHS) process from elemental powders (K. Upadhya, J. Yang, W. Hoffman, Bull. Am. Ceram Soc., page 51, 1997 A. Makino, C. K. Low, J. Am. Ceram Soc. 77(3), 778, 1994. Also described in U.S. Pat. No. 5,061,662 by J Jung.) followed by milling, pressing and sintering at high temperatures in the range of 1900-2000° C. or hot isostat pressing at 1800° C. or more. This process also leads to coarser grains and costly high temperature furnaces to get a 95% or more dense materials. Beside these, the use of elemental powders makes the process cost intensive, also milling of the synthesised powder composite powder is required, which are very hard when processed through elemental stating powders. This step includes lot of impurity of the milling media during processing It is also known to carry out preparation of alumina-Ti/Zr diboride composite by SHS process from their oxides and aluminothermic reduction (Jenq Liu and P. Darrellown by J. Am. Ceramic society, 1991, 74 (1), pp 241-43, V. Sundaram, K. V. Logan and R. F. Speyer; J. Mater. Res., 1997, 12, pp 1681-1684. S P. Ray: Metallurgical Transaction A, 1992, 23A, pp 2381-2385. S. Postrach, J. Potschke: J. Euro. Ceram. Soc., 2000, 20, pp 1459-1468). The prepared powders are milled and sintered at in the range of 1800-2000° C. or hot isostat pressing at 1800° C. or more. This process also leads to coarser grains and costly high temperature furnaces to get a 95% or more dense materials. However, the powders are loosely bound so milling is easy and hence the impurities are included to the lesser extent compared to particulate mixing process.

Reference is made to U.S. Pat. No. 4,647,405 which discloses the reaction synthesis and consolidation of ceramic composite of group IVA metal diboride-alumina. While the said patent reports a good dense body the composite had bulky agglomerates of alumina.

OBJECTS OF THE INVENTION

The main object of the present invention is to provide an improved process for in-situ preparation of alumina-(Ti, Zr) borides composite.

Another object of the present invention is to provide an improved and faster process for the in-situ fabrication of $Al_2O_3$—(Ti, Zr) borides composite using cheaper raw materials thereby reducing the cost of production.

SUMMARY OF THE INVENTION

Accordingly the present invention provides an improved process for the in-situ preparation of alumina-(Ti, Zr) borides composite which comprises:

(i) mixing and milling of Ti and Zr metal and their oxides, boron oxide and aluminium, (ii) pelletizing the mixture obtained in step (i) to obtain pellets with a diameter in the range of 10-80 mm and height in the range of 15-20 mm, (iii) igniting the pellets obtained in step (ii) to trigger the in-situ SHS reaction for preparation of $Al_2O_3$—(Ti, Zr) boride composite and simultaneous loading of the composite for in-situ densification during SHS under the pressure in the range of 40-200 atmosphere with synthesis time and delay timings varying in the range of 0-180 s In one embodiment of the invention, the mixing and milling in step (i) is carried out with Ti and Zr metal and their oxides, boron oxide and aluminium in a molar ratio in the range of 1-10:3-4:5-7:8-15 for a period ranging between 0.5 to 4 hrs.

In another embodiment of the invention the raw materials are of analytical grade.

In yet another embodiment of the invention the particle size of the raw materials are in the following range:

| | |
|---|---|
| Ti and Zr metal: | 20-200 micrometer |
| Ti and Zr metal oxides: | 1-100 micrometer |
| boron oxide: | 5-200 micrometer |
| aluminum: | 1-100 micrometer. |

DETAILED DESCRIPTION OF THE INVENTION

The process of the present invention provides an improved process for the in-situ fabrication of dense $Al_2O_3$—(Ti, Zr) borides composite using cheaper raw materials such as oxides of the components and one of the constituents as metal powder. The process is capable of fabrication of range of composites based on alumina with (Ti, Zr) borides at different volume percent. The synthesis and densification is simultaneous. The density achieved is very high ranging from 93% to 98% of that of theoretical density. The grain growth could be controlled to very fine size of the order of 1-5 micrometer to sub-micron level, which is required for obtaining high strength composites. The process is very fast the in-situ reaction and densification takes only few seconds to get a good dense composite.

The process of the invention comprises mixing and milling of raw materials selected from Ti and Zr metal, oxides thereof, boron oxide and aluminium in desired molar ratios, preferably in the range of 1-10:3-4:5-7:8-15 for a period ranging between 0.5 to 4 hrs. The mixture is then pelletized to form pellets with a diameter in the rage of 10-80 mm and height in the range of 15-20 mm. The pellets are then ignited to trigger the in-situ SHS reaction for preparation of $Al_2O_3$—(Ti, Zr) boride composite and simultaneous loading of the composite for in-situ densification during SHS under the pressure in the range of 40-200 atmosphere with synthesis time and delay timings varying in the range of 0-180 seconds. By the process of the present invention a high dense product varying from 90-98% of that of theoretical density has been obtained. The selected raw materials are preferably of analytical grade. The particle size of the raw materials preferably are in the following range: Ti and Zr metal 20-200 micrometer, Ti and Zr metal oxides: 1-100 micrometer; boron oxide: 5-200 micrometer and aluminum 1-100 micrometer.

The novelty of the process resides in the in situ preparation or consolidation of the composite using a novel SHS route with cheaper raw materials. The process is fast and grain growth are controlled with grain sizes of the order of 5 micrometer or less and varying density in the range of 90 to 97% being obtained depended on the process parameters, initial materials, cooling and ignition. The X-Ray diffraction analyses show the presence of Ti/Zr diboride and alumina phase only Microstructure analyses by SEM show a microstructure of a very dense body and grains ranging in submicrometer to 2-3 micrometer in size. The materials show very high macro-hardness even with presence of many grain boundaries.

The following examples are presented by way of illustration and should not be construed to limit the scope of the present invention.

EXAMPLE—1

A 1 Kg batch with molar ratio 3:3:5 of Zirconium dioxide, aluminium and boron oxide was mixed in a ball mill for 1.5 hrs. Pelletisation of the powder was done till 60 mm diameter and 20 mm height at load of 40 Ton. The pellet was ignited to trigger SHS process in a die by tungsten (W) wire from one side of the disc for a programmed time of 6 & 3 seconds as delay and press times and in-situ pressed at 100 atmosphere The resultant densed mass was cooled and density obtained was about 93% of that of theoretical density XRD of the pellet show the presence of Zirconium diboride and Aluminium oxide phases only. The microstructure of fracture as well as cross sectional cut and polished samples show the presence of fine grained boride (0.5-2 micrometer) embedded in coarser alumina (0.5-5 micrometer).

| Ts (Sec) | Td (Sec) | P (atmosphere.) | phases present | % densification composite | Grain size range boride, alumina in μm |
|---|---|---|---|---|---|
| 6 | 3 | 90 | $Al_2O_3$, ZrB2 | ~93 | 0.5-2, 0.5-5 |

Synthesis time: Ts,
delay time Td,
load: P

EXAMPLE—2

A 1 Kg batch with required amount of Zirconium dioxide, Titanium, aluminium and boron oxide was mixed in a ball mill for 2 hrs. The pelletisation of the powder was done of 60 mm diameter and 20 mm height at the load of 40 Ton. The pellet was ignited to trigger the SHS process in a die by W-wire from one side of the disc for the programmed time of 15 second and then pressed at 180 atmosphere in situ for 2 seconds. The resultant densed mass was cooled and density obtained was about 96% of that of theoretical density. The XRD of the pellet show the presence of titanium diboride, Zirconium diboride and Aluminium oxide phases only. Occasionally the presence of very weak peaks of Zirconium oxide are also seen depending on the ratio and synthesis parameter. The microstructure of fracture as well as cross sectional cut and polished samples shows the presence of fine grained boride (0.5-2 micrometer) embedded into coarser alumina (0.5-5 micrometer)

| Parameters during processing | | | | | |
|---|---|---|---|---|---|
| Ts (Sec) | Td (Sec) | P (atmosphere) | phases present | % densification composite | Grain size range boride, alumina in μm |
| 15 | 2 | 180 | $Al_2O_3$, ZrB2, $TiB_2$ | ~96 | 0.5-2, 0.5-5 |

Synthesis time: Ts,
delay time: Td,
load: P

EXAMPLE—3

A 1 Kg batch with required amount of Zirconium dioxide, aluminium, boron oxide, aluminium oxide and Ti was mixed in a ball mill for 2 hrs. The pelletisation of the powder was done of 60 mm diameter and 20 mm height at the load of 40 Ton. The pellet was ignited to trigger the SHS process in a die by W-wire from one side of the disc for the programmed time of 12 second and then pressed at 100 atmosphere in situ for 2 seconds. The resultant densed mass was cooled and density obtained was about 95% of that of theoretical density. The XRD of the pellet show the presence of titanium diboride, Zirconium diboride and Aluminium oxide phases only. The microstructure of fracture as well as cross sectional cut and polished samples shows the presence of fine grained boride (0.5-2 micrometer) embedded into coarser alumina (0.5-5 micrometer)

Parameters during processing

| Ts (Sec) | Td (Sec) | P (atm.) | Phases present | % densification composite | Grain size range boride, alumina in μm |
|---|---|---|---|---|---|
| 12 | 3 | 130 | $Al_2O_3$, $ZrB_2$, $TiB_2$ | ~95 | 0.5-2, 1-5 |

Synthesis time: Ts,
delay time: Td,
load: P

The Main Advantages of the Present Invention are:
1. This invention relates to an improved process for the fabrication of in-situ synthesis and consolidation of $Al_2O_3$—(Ti, Zr) borides composites of approximate 93-98% density to that of theoretical density with controlled grain-growth in the range of less than or the order of 2 micrometer grain size using a dynamic SHS process.
2. The process uses cheaper raw materials compared to conventionally used metal powders.
3 The process is fast only few seconds are required for in-situ synthesis and consolidation.
4. The Process is energy efficient, No high temperature furnaces are required for the synthesis and sintering only momentarily ignition source is required for starting the self propagating exothermic reaction.
5. The obtained product is homogeneous and fine grain, which is required for enhancing strength and toughness.
6. The process is economically as well as industrially viable.
7. The process can be used to fabricate a range of composite consisting alumina and (Ti, Zr) borides with 92-98% density.
8. The obtained product is electrically conducting with resistivity in the range of 300-800 microohm centimeter. Hence can be machined easily by spark erosion process.
9. The composite target for nano and hard coatings of Ti—Zr—Al—B—O system by sputtering can be fabricated by this process

We claim:
1. An improved process for the in-situ preparation of alumina-(Ti, Zr) borides composite which comprises:
   (i) mixing and milling Ti and Zr metal and their oxides, boron oxide and aluminum,
   (ii) pelletizing the mixture obtained in step (i) to obtain pellets with a diameter in the range of 10-80 mm and height in the range of 15-20 mm,
   (iii) igniting the pellets obtained in step (ii) to trigger the in-situ SHS reaction for preparation $Al_2O_3$—(Ti, Zr) boride composite and simultaneous loading of the composite for in-situ densification during SHS under the pressure in the range of 40-200 atmosphere with synthesis time and delay timings varying in the range of 0-180 seconds.

2. A process as claimed in claim 1 wherein the mixing and milling in step (i) is carried out with Ti and Zr metal and their oxides, boron oxide and aluminum in a molar ratio in the range of 1-10: 3-4: 5-7: 8-15 for a period ranging between 0.5 to 4 hrs.

3. A process as claimed in claim 1 wherein the selected raw material are of analytical grade.

4. A process as claimed in claim 1 wherein the particle size of the raw materials are in the following range:

| | |
|---|---|
| Ti and Zr metal: | 20-200 micrometer |
| Ti and Zr metal oxides: | 1-100 micrometer |
| boron oxide: | 5-200 micrometer |
| aluminum: | 1-100 micrometer. |

\* \* \* \* \*